Figure 3:
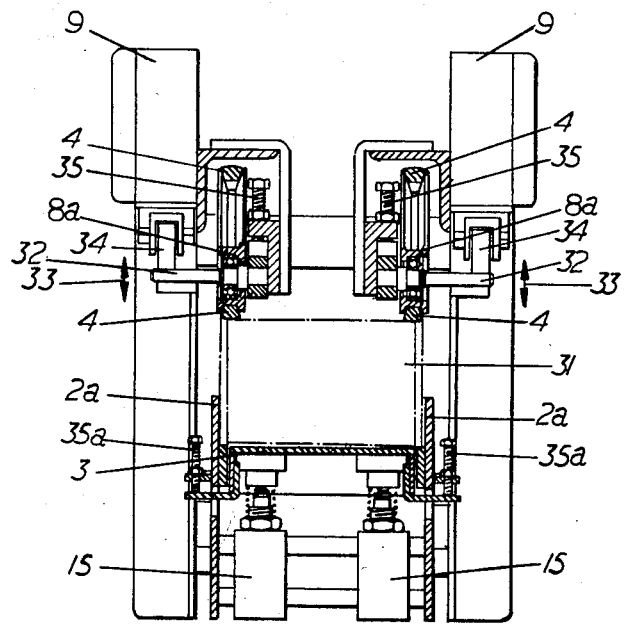

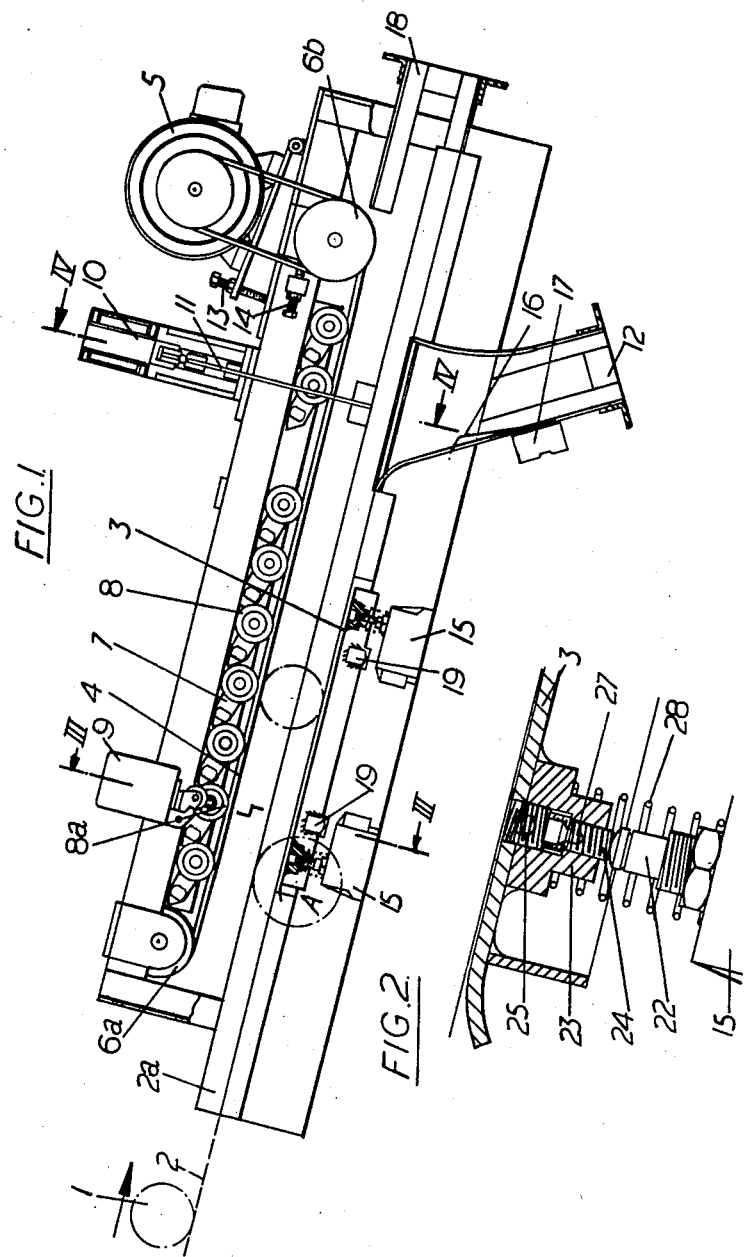

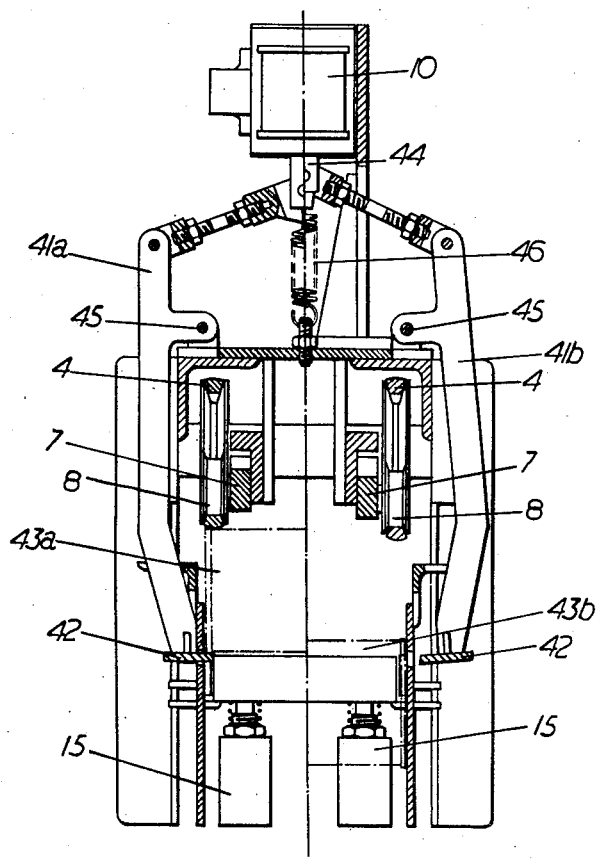

United States Patent Office 3,133,639
Patented May 19, 1964

3,133,639
TESTING AND SORTING CIRCULAR ARTICLES
Hans Kurt Spier, Hannover-Vinnhorst, Wolfgang Mölke, Hannover-Hainholz, and Wolfgang Seyderhelm, Hannover-Vinnhorst, Germany, assignors, by mesne assignments, to J. A. Schmalbach AG, Braunschweig, Germany, a corporation of Germany
Filed Nov. 16, 1961, Ser. No. 152,791
Claims priority, application Germany Nov. 16, 1960
3 Claims. (Cl. 209—88)

The invention relates to a method of and apparatus for testing and sorting articles of circular cross-section.

In the manufacture of articles of circular cross-section, such as milk tins and round oil tins which have a central filling aperture, it is essential to ensure that the tin has the desired circular section as accurately as technical considerations will allow in order that the filling aperture may be disposed exactly in the center of the top end of the tin. However accurate manufacture may be, articles which are not truly round are bound to be produced. When these articles are mass-produced, the testing of their outer shape after manufacture must be very rapid as well as reliable.

The present invention enables the necessary testing to be performed rapidly and reliably and ensures that articles having sections which are outside the acceptable tolerances are rejected.

According to the present invention an apparatus, for testing and sorting articles of circular section, comprises a number of electrical switches, a contact plate resiliently mounted above said switches and arranged to act as a test path along which the articles to be tested are rolled, a guide rail extending longitudinally of each side of said contact plate to guide said articles on said contact plate, a moving belt for engaging and rolling said articles, and first and second exits, the apparatus being so arranged that satisfactory articles are directed out of the apparatus through said first exit but when said contact plate is vertically displaced by more than a predetermined amount as a result of a non circular article passing over said contact plate, said plate closes one or more of said switches which causes said non circular article to be directed out of the apparatus through said second exit.

The present invention also includes a method of testing and sorting articles of circular section wherein the articles are rolled in rapid sequence to a test path having a length substantially greater than the circumference of an article, each article being accelerated as it passes onto the test path so that only one article at a time is present on the test path and that article being examined at least once for deviations from the circular, the result of the examination being used to control the delivery of the article in one of at least two possible directions.

Preferably, the length of the test path is one and a half times the circumference of the article to ensure that all parts of the circumference of the article engage once with the contact plate.

At the end of the test path are two exit routes. The first route, which is for satisfactory articles, is normally open, while the second exit route, for rejects, is normally closed. Through the agency of contacts and appropriate electrical circuitry the exit route for rejects is opened whenever an unsatisfactory article is on the test path, the rejects exit route being reclosed when the faulty article has passed along the rejects exit route. Consequently, the rejects exit route must be opened separately for each separate reject, whereas satisfactory articles can readily leave the test path along the normally open route. A special switch may be operated by each reject when it passes through the reject exit, so that the test path is ready for the next article.

One example of an apparatus constructed in accordance with the present invention and suitable for carrying out the method according to the present invention is illustrated in the accompanying drawings, in which:

FIGURE 1 is a partly sectional side elevation of the apparatus;
FIGURE 2 is an enlarged view of the part of the machine which is encircled and marked A in FIGURE 1;
FIGURE 3 is a section along the line III—III, in FIGURE 1; and
FIGURE 4 is a section along the line IV—IV, in FIGURE 1.

An article 1 which it is to be tested rolls down an inclined plane 2 into the testing apparatus where it is prevented from slipping or twisting laterally by stop rails 2a. Before the article runs onto a contact plate 3, it is engaged by two V belts 4 which extend above and along the length of the test path. The belts 4, which are driven by a driving motor 5, run over reversing rollers 6a, 6b and idling rollers 8 that are pivotally mounted on pivoting arms 7. The second pair of idling rollers 8a is connected to contact switches 9 which are so wired to an electromagnet 10 in such a way that a trap 11, disposed above an exit 12 for rejects, is opened when only one of the two contacts is operated but remains closed when neither or both of the contacts are operated. The apparatus is particularly useful in ensuring that when hollow articles, such as cans, are tested, articles which are faulty at one end, i.e., are accidentally not given top and bottom ends, are rejected. The first pair of idling rollers are not used as contact supports for this pair of rollers may run unsteadily when the article to be tested runs onto the contact plate 3 near the first roller.

The belts 4 accelerate the articles to be tested so that even if the articles follow one another very closely down the plane 2, they are kept far enough apart from one another in the test path to ensure that only one article at a time is present above the contact plate 3. The tension of the belts 4 can be adjusted by adjusting screws 13, 14.

The contact plate 3 bears resiliently at each of its four corners upon a microswitch 15. When any microswitch 15 is operated by being depressed by the contact plate 3 as the result of the section of a test article deviating from the circular, the electromagnet 10 is operated and this releases the trap 11 as previously described, so that the rejected article leaves the apparatus by way of the exit 12.

The exit 12 has a switch 17 which is operated by a small pressure. The reject, as it drops through the exit 12, engages with a spring 16 that operates the switch 17 which so energises the electromagnet 10 that the trap 11 returns to the closed position. Consequently, immediately after a reject has left the test path, the apparatus is ready for further use, i.e. it is in the position for articles which have been found satisfactory to pass to the normal exit 18.

To obviate incorrect operation, the contact plate 3 must be exactly coplanar with the inclined plane 2. Coplanarity can be ensured by adjusting devices 19.

FIGURE 2 shows how the contact plate 3 is mounted on the four microswitches 15. The illustrated microswitch 15, which is shown diagrammatically, has an operating button 22 which is operated by a very small pressure. The contact plate 3 has, in a hollow foot 23, an adjusting screw 24 which can be fixed by a securing screw 25 that is turned by means of a hexagonal recess 27. To prevent the full contact plate load from resting entirely on the four contacts the load on the buttons 22 is reduced by a spiral spring 28. If the section of an article being tested deviates from the desired circular shape, the contact plate 3 and the parts 23—25 and 27 which are rigidly connected to it are pressed down against the force of the spring 28, and the button 22 closes the microswitch 15. The magnet 10 (FIGURE 1) is therefore energised and operates the trap 11 so that the rejected article can leave the apparatus by way of the exit 12.

FIGURE 3 shows the co-operation between the contact plate 3 and the idling rollers 8a. An article 31 to be tested is in the test path, exactly between the contact plate 3 and the rollers 8a. Each of the rollers 8a has an extended spindle 32 arranged to operate a microswitch 9 when the spindle 32 is moved in either of the directions indicated by an arrow 33, for the spindles 32 operate switch buttons 34 when they are thus moved. However, the trap 11 is opened by the electromagnet 10 only if the two contacts are not closed simultaneously, for instance, when the top or bottom end of a can is missing and the idling rollers distort the originally circular shape of the can.

The rollers 8a are provided with pivoting arms 7, the pivoting range of which can be limited for each roller individually by means of an adjusting screw 35. The reason for making the idling rollers pivotable is to ensure that the system is not excessively sensitive at this place and that as a result satisfactory articles are not rejected as faulty. Because of the presence of the pivoting arms, the microswitches 9 connected to the idling rollers 8a are operated only when a difference in pivoting is exceeded by predetermined amount, for example 8 mm. difference in height.

FIGURE 3 shows how the adjusting device 19 works. Four adjusting screws 35a disposed near each corner of the contact plate 3 are used to align the plate with the plane of the test path 2.

Normally, a stop member comprising two stop arms 41a, 41b keeps the rejects exit closed by way of closure ledges 42, as shown on the left-hand side of FIGURE 4. The tested article 43a, moved by the belts 4, continues to move in a straight line, for instance, to a collecting receptable or directly to a can filling station. However, if the electromagnet 10 has been operated by one of the microswitches, the core 44 is attracted against the force of the spring 46 and moves the stop arm 41b which is pivotally mounted at 45, so that the rejects exit aperture is opened. The closure members 42 beyond which the satisfactory articles can pass pivot out laterally open the rejects exit and simultaneously interrupt the exit for satisfactory products. Once the reject has passed the trap, the electromagnet is de-energised by way of the switches 16, 17 and the spring 46 moves the ledge 42 back into the reject exit aperture so that this exit is closed and the exit for satisfactory articles is reopened.

We claim:

1. Apparatus for testing and sorting articles of circular section, said apparatus comprising a first group of electrical switches, a contact plate resiliently mounted above said switches and constituting a test path along which articles to be tested may be rolled, said contact plate being adapted to actuate said switches when it is displaced vertically by more than a predetermined amount, a pair of laterally spaced moving belts extending above and along the length of said contact plate for engaging articles being tested and rolling them on said contact plate, a second group of electrical switches associated with each of said moving belts and adapted to be actuated when said belts are displaced vertically by more than a predetermined amount, a guide rail extending longitudinally of each side of said contact plate for guiding articles being rolled on said contact plate, a first exit means arranged in the path of travel of articles being rolled on said contact plate for receiving unsatisfactory articles, said exit means having a normally closed aperture, an electromagnet connected with said means for opening said aperture, said electromagnet being operated upon actuation of any one of the switches in the first-mentioned group of switches, and being operated upon actuation of any one of the switches in the second-mentioned group of switches, and second exit means arranged in the path of travel of articles being tested for receiving satisfactory articles and located beyond said first exit means.

2. Apparatus according to claim 1, in which each switch in the second mentioned group of switches is actuated by vertical movement of a roller on which runs the belt associated with said switch.

3. Apparatus according to claim 1 further comprising a switching device incorporated in the first exit and operable when an article passes through said exit for reclosing said aperture means.

References Cited in the file of this patent
UNITED STATES PATENTS

| | | |
|---|---|---|
| 1,612,023 | Huber | Dec. 28, 1926 |
| 2,937,749 | Strzala | May 24, 1960 |
| 3,042,199 | Welchman | July 3, 1962 |

FOREIGN PATENTS

| | | |
|---|---|---|
| 547,836 | Canada | Oct. 22, 1957 |